Feb. 4, 1941.  A. WEITHALER  2,230,519
PROCESS FOR THE PRODUCTION OF CEMENT COATINGS ON WALLS, AND THE LIKE
Filed Feb. 3, 1937
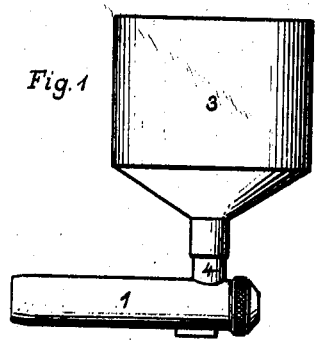
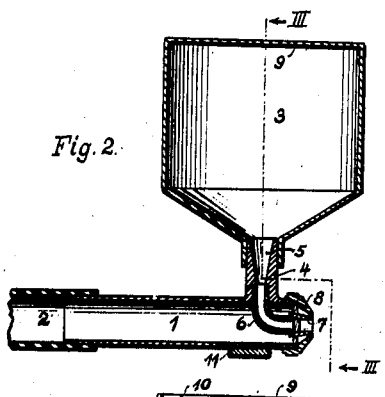
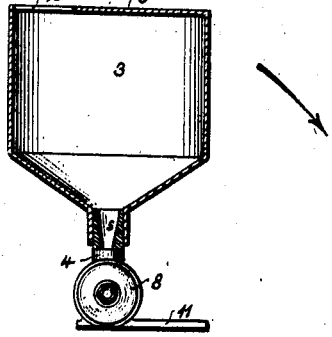
Inventor:
Anton Weithaler, deceased,
by Antonie Knoll, Nee Weithaler,
Administratrix Patented Feb. 4, 1941

2,230,519

UNITED STATES PATENT OFFICE 2,230,519

PROCESS FOR THE PRODUCTION OF CEMENT COATINGS ON WALLS AND THE LIKE

Anton Weithaler, deceased, late of Crailsheim, Germany, by Antonie Knoll, née Weithaler, administratrix, Crailsheim, Germany Application February 3, 1937, Serial No. 123,878
In France November 18, 1936

4 Claims. (Cl. 91—68)

This invention relates to a process for coating plaster walls and other articles with a cement glazing by cold means.

Processes are already known for producing so-called cement glazings on walls in which appreciable quantities of non-cementitious substances, such as sodium chloride, potassium nitrate and the like, are added to the glazing mass proper. In these processes it was necessary to ensure by special artifices, that an efflorescence of the non-cementitious salts was prevented, for which reason the point of setting had to be very carefully timed, and furthermore care had to be taken by adding to the glazing mass particles soluble in lacquer, that a tightly adhering lacquer coating was formed which excluded the atmosphere from the glazing mass, so that the non-cementitious salts were prevented by hermetic insulation from the air from efflorescing. Carrying out of this process presented considerable difficulties for unskilled, careless operators and often jeopardized the success of a job.

It is the object of the invention to provide an improved process of the kind described.

To this end a water-proof cement dressing is applied to the article to be glazed. A pasty glazing mass is then prepared by stirring hydraulic cement with about half the quantity by weight of water and a quantity of an agent accelerating the setting of the cement is then added to the mass, this quantity constituting not more than 1% of the mass. Finally, the mass is sprayed on to the applied dressing of water-proof cement immediately after it has set.

Pure hydraulic cement is employed for making the glazing mass, to which, for example, aluminium chloride and calcium chloride are added as accelerating agents at a total not exceeding 1 per cent, if desired, coloring substances.

To enable the cementitious glazing to firmly adhere to the waterproof dressing, the waterproofing must be effected in the mass of the dressing itself and not by subsequent superficially applied non-cementitious waterproof coatings or coverings which do not afford the necessary adhesion for the cement glazing.

According to the invention the waterproofing of the dressing which consists chiefly of cement and suitable filling substances such as sand or the like, is effected by an addition of about two percent of a suitable heavy metal stearate or palmitate in finely divided state, so that the waterproof property of the dressing necessary for the present purpose is obtained without impairing the adhesiveness for the cement glazing to be applied.

When the dressing has completely set and contains if any, only the moisture remaining after the setting, the glazing mass previously prepared in a suitable consistency from two parts by weight of hydraulic cement with the necessary color admixture, one part by weight of water and at the most one percent of a substance accelerating the setting, is sprayed by means of a known spraying device.

The following is an example of the manner of carrying out the method according to the invention:

The wall surface to be glazed, irrespective of whether it is already plastered or not, is coated with a waterproof dressing material to a thickness of about 6 to 10 millimetres. For producing this dressing 4 parts by weight of cement and 1 part by weight of lime are mixed with 12 parts by weight of fine sand.

To 100 parts by volume of this mixture 2 parts by volume of palmitate of zinc are added and the whole is carefully mixed in dry condition; thereafter the mixture is stirred with water until the necessary consistency is obtained.

The setting of the dressing produced with this material requires about one day but the glazing material is applied two days after the application of the dressing. For producing the glazing a good hydraulic cement is employed to which the necessary cement colors are added but at the most 1 part by volume of cement color to 8 parts by volume of cement. 8 grammes of aluminium chloride are then added to 10 litres of water as agents for accelerating the setting of cement and ½ litre of this water is mixed with 1 kilogramme of the colored dressing.

The colored stirred glazing must be used as quickly as possible, but in any case within two hours. The sprayed glazing sets in about 24 hours.

The spraying pistol illustrated, by way of example, in the accompanying drawing has been found suitable for spraying on the glazing mass.

In the drawing:

Fig. 1 shows the spraying pistol in side elevation,

Fig. 2 is a vertical longitudinal section,

Fig. 3 is a section on line III—III of Fig. 2.

On the spraying neck 1 of the pistol a rubber tube 2 or the like is fitted which supplies to the spraying pistol blast air under moderate pressure from a fan, vacuum cleaner or the like. The material to be sprayed, which is preferably of pasty consistency, is stored in a container 3 arranged above the spraying neck 1, mounted on a lateral projection 4 of the neck and secured in position in a suitable manner. The bore 5 in the lateral projection 4 communicates with pipe 6 extending coaxially in the interior of the spraying neck 1 and with a nozzle 7, adjustably fixed, by means of a screw connection, on the free end of the pipe 6.

The material passes from the container 3 preferably by gravity to the outlet of nozzle 7 and is here carried off in known manner by the air blast fed through the spraying neck 1 as the passage for the air blast near the outlet of the nozzle 7 is restricted to a very narrow cross section by a conical cap 8 screwed on to the end of the spraying neck 1 and consequently adjustable in the direction of the axis of the spraying neck, so that the speed of the air blast is correspondingly increased.

In spite of all precautionary measures it was hitherto not possible to entirely prevent that a portion of the material to be sprayed which is sprayed in the form of a more or less dry dust settled on the already finished portions of the sprayed-on wall and made this rough, that is deprived it of precisely that property which is the characteristic of a "glazing."

It has been found by experiments that any spraying of the material in the form of disturbing dust can be entirely avoided if a twist about the axis of the direction in which the blast air is moved is imparted to the blast air near the outlet aperture of nozzle 7, this being attained by spirally extending grooves, guide surfaces or the like (similar to the rifling of guns, but not shown in the drawing) on the conical inner side of the cap 8.

It has been found necessary for obtaining a perfect spraying to make it possible to slightly vary within certain limits the hydrostatic pressure of the material to be sprayed becoming efficacious in the nozzle 7, which, according to the invention, is attained by providing the container 3 with a lid 9 rigidly connected therewith and having an inlet aperture 10 near only one portion of the side wall. By this measure it is possible to regulate within certain limits the hydrostatic pressure of the spraying material by simply turning about its axis the spraying neck carrying the pistol. This form of construction of the container 3 likewise makes it possible to put the spraying pistol down for a certain time without the spraying material to be sprayed flowing out and soiling the nozzle 7 or the inner side of cap 8. For this purpose a foot 11 consisting of a shaped metal strip or the like is fitted on the underside of the spraying neck 1, said foot extending in the normal position laterally in horizontal direction and enables the spraying pistol (Fig. 3) to be turned through 90° in the direction of the arrow and to be set down in this position. The supporting foot 11 also indicates to the user on which side the closed part of the lid 9 of the container is situated when this position is not positively given.

What is claimed is:

1. Process for coating plaster walls and other articles with a cement glazing by cold means, consisting in applying on the articles to be glazed a waterproof cement dressing, in preparing a pasty mass by stirring hydraulic cement with about half the quantity by weight of water, adding a small quantity, not exceeding 1%, of an agent accelerating the setting of the cement, and in spraying this pasty mass on the waterproof cement dressing immediately after the setting is completed.

2. Process for coating plaster walls and other articles with a cement glazing by cold means, consisting in applying on the articles to be glazed a waterproof cement dressing composed of hydraulic cement with a small admixture of a stearate and a suitable filling substance, preferably fine sand, in preparing a pasty mass by stirring hydraulic cement with about half the quantity by weight of water, adding a small quantity, not exceeding 1%, of an agent accelerating the setting of the cement, and in spraying this pasty mass on the waterproof cement dressing immediately after the setting is completed.

3. Process for coating plaster walls and other articles with a cement glazing by cold means, consisting in applying on the articles to be glazed a waterproof cement dressing, in preparing a pasty mass by stirring hydraulic cement with about half the quantity by weight of water, adding a small quantity, not exceeding 1%, of a mixture of aluminium chloride and calcium chloride, and in spraying this pasty mass on the waterproof cement dressing immediately after the setting is completed.

4. Process for coating plaster walls and other articles with a cement glazing by cold means, consisting in applying on the articles to be glazed a waterproof cement dressing composed of hydraulic cement with a small admixture of a palmitate and a suitable filling substance, preferably fine sand, in preparing a pasty mass by stirring hydraulic cement with about half the quantity by weight of water, adding a small quantity, not exceeding 1%, of an agent accelerating the setting of the cement, and in spraying this pasty mass on the waterproof cement dressing immediately after the setting is completed.

ANTONIE KNOLL, née WEITHALER,
*Administratrix of the Estate of Anton Weithaler, Deceased.*